J. F. COURSON.
DRAFT GEAR.
APPLICATION FILED NOV. 22, 1913.
1,121,482.
Patented Dec. 15, 1914.
2 SHEETS—SHEET 1.
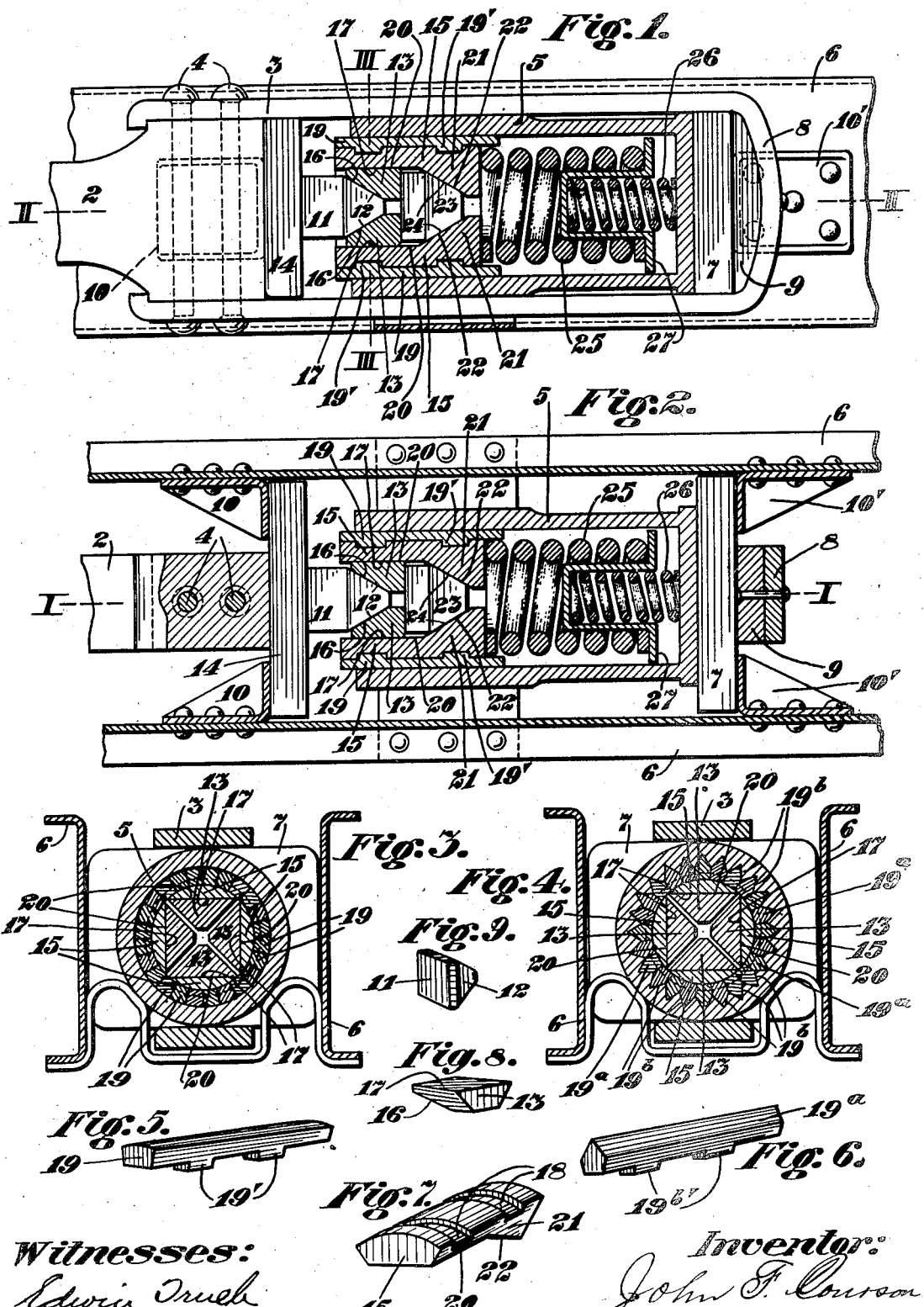
Witnesses:
Edwin Trub
W. A. Heckman
Inventor:
John F. Courson
by O. M. Clarke
his attorney

J. F. COURSON.
DRAFT GEAR.
APPLICATION FILED NOV. 22, 1913.

1,121,482.

Patented Dec. 15, 1914.
2 SHEETS—SHEET 2.

Witnesses:
Edwin Trueb
Wa Hechman

Inventor:
John F. Courson
by C. M. Clarke
his attorney

UNITED STATES PATENT OFFICE.

JOHN F. COURSON, OF PITCAIRN, PENNSYLVANIA.

DRAFT-GEAR.

1,121,482.

Specification of Letters Patent. Patented Dec. 15, 1914.

Application filed November 22, 1913. Serial No. 802,410.

*To all whom it may concern:*

Be it known that I, JOHN F. COURSON, a citizen of the United States, residing at Pitcairn, in the county of Allegheny and State of Pennsylvania, have invented certain new and useful Improvements in Draft-Gears, of which the following is a specification.

My invention consists of an improvement in friction draft gears for railway cars, etc., and it has for its object to provide a draft gear of simple construction and high efficiency designed to utilize the wedging and releasing qualities of wedge blocks arranged between a central buffing member and surrounding friction members, provided with bearing shoes, and spring mechanism, within an inclosing casing, and adapted to transmit buffing and pulling strains to the car under-frame.

One of the particular objects of the present invention is to provide, in a friction draft gear of this type, means for exerting frictional resistance between the friction members and the casing, by the coöperating action of opposing wedge members adapted to equalize and multiply the strain and to transform it into frictional resistance, evenly throughout the length of the friction creating members.

The present invention is somewhat similar to that of my prior patent of Aug. 12, 1913, No. 1070229, the present construction of friction-creating mechanism embodying certain features of differences thereover in the construction of the friction creating elements, the wedge actuated carriers therefor, the movable friction creating elements themselves, and other features of construction and improvement, as shall be more fully hereinafter described.

Figure 10:
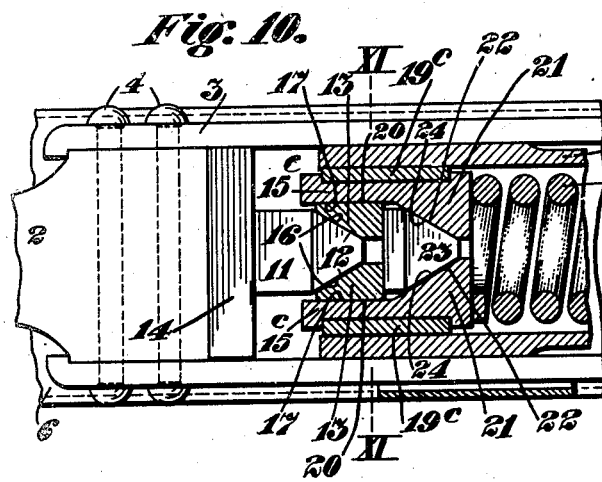
Figure 11:
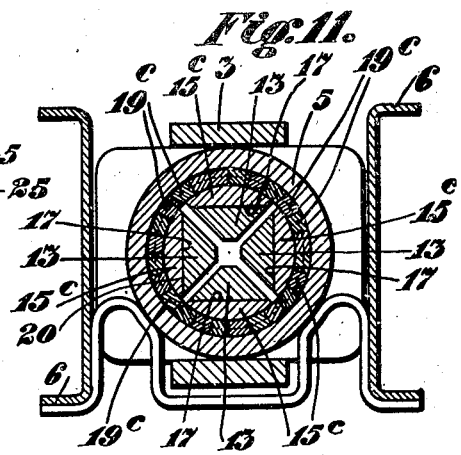
Figure 12:
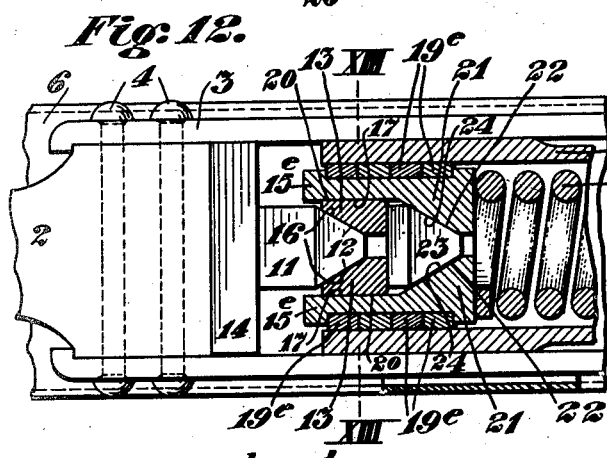
Figure 13:
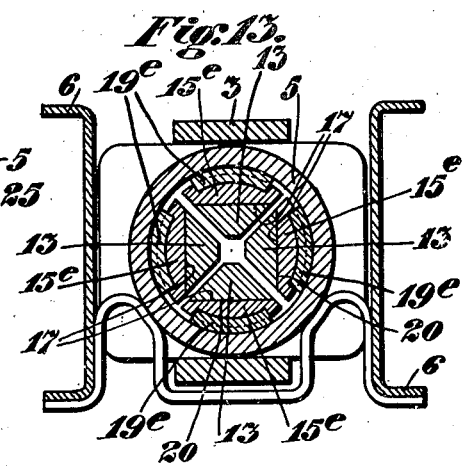
Figure 14:
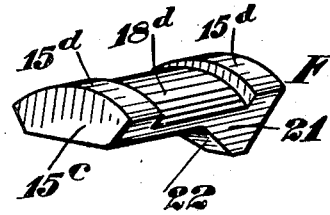
Figure 16:
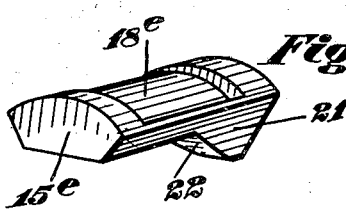
Figure 15:
Figure 17:

In the drawings illustrating the invention,—Figure 1 is a central vertical sectional view of the complete draft gear assembled, the parts being shown in extended position, the section being indicated by the line I—I of Fig. 2. Fig. 2 is a horizontal sectional view of the gear, the section being indicated by the line II—II of Fig. 1. Fig. 3 is a cross sectional view, indicated by the line III—III of Fig. 1. Fig. 4 is a similar sectional view, showing a modified construction having a plurality of closely assembled friction strips or shoes engaging receiving grooves in the casing. Fig. 5 is a perspective detail view of one of the friction strips used in the construction of Figs. 1, 2 and 3. Fig. 6 is a similar view showing a strip as used in the construction of Fig. 4. Fig. 7 is a similar view, showing one of the wedge actuated friction shoe carriers. Fig. 8 is a similar view, showing one of the expanding wedge blocks, which coöperate with the central wedge block and the friction shoe carrier. Fig. 9 is a similar view of the inner central expanding wedge. Fig. 10 (Sheet 2) is a partial longitudinal vertical sectional view, similar to Fig. 1, showing a modified construction of the friction shoe carriers and friction strips. Fig. 11 is a cross sectional view, indicated by the line XI—XI of Fig. 10. Fig. 12 is a sectional view, similar to Fig. 10, showing a further modified construction of the friction members. Fig. 13 is a cross sectional view, indicated by the line XIII—XIII of Fig. 12. Fig. 14 is a perspective detail view of one of the wedge actuated friction shoe carriers used in the construction of Figs. 10 and 11. Fig. 15 is a similar view of one of the friction strips used therewith. Fig. 16 is a similar detail view of a friction shoe carrier used with the friction members in the construction of Figs. 12 and 13. Fig. 17 is a similar view of one of the friction members used therewith.

In the drawings, 2 represents the drawbar of a coupler fixedly connected with the yoke 3 by transverse bolts 4 in the manner customary in this art, said yoke embracing the casing or cylinder 5 at top and bottom as shown, the yoke and casing being located between the central sills 6, 6.

A bearing block or piece 7 is preferably set against the rear end of cylinder 5, against the outer end of which block bears the rounded end 8 of yoke 3 with an interposed filling block 9, preferably secured to the end of the yoke.

The front stops 10 extend inwardly from each side of the center sills 6 and sustain the pulling effect of the draft gear and impart it to said sills, while similar rear stops 10' act to receive and impart buffing strains in the same manner.

The central wedge block 11 has angularly disposed wedge faces 12 of pyramidal arrangement, corresponding in number and degree of slope to the expanding wedges 13, said faces tapering inwardly toward the center at such an angle to the horizontal as to produce a maximum expansion with resulting free release.

Wedge block 11 extends forwardly and bears by its main body portion against front follower plate 14, which plate in turn engages the rear end of drawbar 2 between the arms of yoke 3.

The expanding wedge blocks 13 are provided with outer faces which engage the inner faces of corresponding friction shoe members or carriers 15, the wedge blocks 13 having at their forward portions inwardly disposed angle faces 16 adapted to co-act with the wedge faces 12 of the front central wedge 11, and outer straight faces 17, substantially parallel with the axial center of the gear, adapted to engage the inner co-acting straight faces 20 of the friction shoe carriers 15.

The friction shoe members or carriers 15, for each expanding wedge block 13, are preferably cylindrically rounded at their outer portions, conforming generally to the curvature of the inner surface of casing 5, and are provided with annular recesses 18 and corresponding limiting shoulders, for the reception of friction members 19, having corresponding interfitting extensions $19^r$. These friction members may be in the form of strips having outer rounded surfaces, as shown in Figs. 1, 2, 3 and 5, and they may have V-shaped ribs $19^a$ for interfitting engagement with correspondingly shaped V-shaped grooves $19^b$, as in Figs. 4 and 6, with interfitting inwardly extending lugs or abutments $19^{b'}$, for longitudinal engagement with the friction shoe carriers.

In the construction shown on Sheet 2 of the drawings, the friction members may consist of longitudinal strips $19^c$ interfitting with the friction shoe carriers $15^c$, provided with limiting projecting collars or ribs $15^b$ and intervening receiving recesses $18^b$, for reception and engagement of strips $19^c$, as shown in Figs. 10, 11, 14 and 15. The friction members may also be made in the form of annularly arranged segmental shoes $19^e$, adapted to seat in receiving cavities $18^e$ of friction shoe carriers $15^e$, as in the construction shown in Figs. 12, 13, 16 and 17.

The inner formation of the friction shoe carriers, the expanding wedge blocks, the central wedge and the various other parts are the same as those heretofore described, and are referred to by corresponding numerals.

In all of the constructions, the friction shoe members or carriers 15 are shown as provided with the inner longitudinally straight faces 20, substantially parallel with the axial center of the gear, and with the outer faces of the shoes, and of the friction members, and the casing, and I have secured good results with such construction. The friction members 15 are provided with inner rearmost portions, deflected inwardly, as shown, providing inner wedge terminal portions 21, having inner wedge faces 22, for co-action with the corresponding wedge faces of the inner central wedge 23. Said wedge 23 is provided at its inner end with series of rearwardly disposed wedge faces 24 respectively, adapted to engage wedge faces 22 of the friction members 15, as clearly shown. Wedge 23 makes direct abutting, non-wedging engagement by its front end against the rear ends of expanding wedges 13, 13, and is thus forced inwardly in buffing at the same rate of travel, or is maintained stationary, in pulling, in uniformity with the expanding wedges 13. Wedges 13 and 23 thus constitute a continuous longitudinal wedge of unvarying length. The result of this arrangement is that as wedges 13 are forced inwardly they force wedge 23 inwardly to the same degree, and as wedges 13 are expanded to press the front portions of friction members 15 outwardly, the wedge 23 positively expands the inner portion of the friction members to the same degree. This is equally true either in buffing or pulling, because the relation of the wedges longitudinally is unvarying, due to their abutting engagement.

Buffing spring mechanism of any suitable or preferred construction, as an outer spring 25, an inner spring 26, and an interposed shell 27, is interposed between the rearmost inner ends of the friction shoe carriers 15 and the inner end of casing 5, for the purpose of opposing inward movement of the friction mechanism, and of retracting it to normal position upon the cessation of either buffing or pulling strains. The spring mechanism does not *per se* form any essential portion of the present invention, and is substantially similar to that shown in my prior application filed Sept. 11, 1913, Serial No. 789279.

The operation of the gear will be readily understood from the foregoing description. In compressing the gear, the members 13 will have a slight longitudinal movement with relation to members 15, wedge 23 being moved inwardly to the same degree the parts, however, being maintained in tight engagement throughout at every stage of the operation, whatever the pressure may be, in either buffing or pulling. The expanding action of wedges 11 and 23 is thus transmitted directly and through the interposed friction shoe carriers 15 to the friction elements 19, etc., whatever their form may be. These elements, or shoes, being mounted in their wedge actuated carriers, and in fixed engagement therewith as to longitudinal travel, will, of course, move with their frictional carriers inwardly on buffing, or will be maintained against forward travel of the surrounding casing 5, under expansion of the wedge mechanism in pulling.

By reason of the exertion of the expanding wedge mechanism, at each end portion of the friction shoe carriers, the carriers and their shoes will be pressed outwardly through their entire length, co-extensive with the extent of the carriers, thereby effecting a uniform degree of frictional engagement with the inner face of the casing co-extensive with the longitudinal area of contact.

It will be observed that, upon inward movement of the central wedge member, in buffing, or upon reverse movement of casing 5, in pulling, against the resisting action of said wedge member and its follower 14, engaging stops 10, lateral separating movement of the wedge members 13 will occur simultaneously with their movement or opposition to the inner wedge member 23, and that said wedge member 23 is thus moved inwardly, effecting separation of the inner wedge portions of carriers 15. These carriers are thus forced inwardly by the effect of the wedge members 23 engaging their inner rearmost portions, thus practically pulling these carriers inwardly by their rearmost portions, in buffing, or retaining them thereby in opposition to the opposing movement of the casing, in pulling.

In either case, the resulting effect is to produce an even symmetrical and steadily increasing expansion of the friction members throughout the longitudinal frictional contacting portions of the gear. This is of great importance and advantage, equalizing the resistance, effecting its steady accumulation and resulting efficiency, while at the same time providing for equal cessation of the frictional engagement upon collapsing of the wedge resistance at each endmost portion of the friction mechanism.

The operation of the apparatus will be readily understood from the foregoing description. The mounting of the friction shoe members, of either of the forms shown, upon their carriers insures positive longitudinal movement upon actuation of the wedging mechanism in either buffing or pulling. The friction shoe members, being separately mounted on their carriers, are capable of easy renewal in case of wear, and may also be made of any suitable metal or material, securing the resulting frictional advantages. It will also be understood, of course, that the outer portions of the friction members 15 may be made to engage directly against the inner surface of the casing, as is commonly done in other friction shoe construction. The wedge mechanism is normally maintained in operative position by the spring mechanism, so that the apparatus is always in condition for immediate application and utilization of the exerted forces.

It will be understood that the construction may be changed or varied in proportions or details by the skilled mechanic, but that all such changes are to be considered as within the scope of the following claim.

What I claim is:

In a friction draft gear, the combination with the casing and the relatively movable drawbar, of friction members having outer portions engaging the casing and inner substantially parallel faces and inwardly extending wedge portions, a central buffing wedge block, expanding wedge blocks between the friction members and said central buffing wedge block, and an inner wedge block having a front transverse face in direct abutting engagement with the inner ends of the expanding wedge blocks maintaining unvarying longitudinal relation thereto and provided with inner sloping faces engaging the inwardly extending wedge portions of the friction members, substantially as set forth.

In testimony whereof I hereunto affix my signature in the presence of two witnesses.

JOHN F. COURSON.

Witnesses:
C. M. CLARKE,
FRED'K STAUB.